United States Patent [19]

Frascara et al.

[11] 4,315,748

[45] Feb. 16, 1982

[54] ALPHABETIC DEVICE

[75] Inventors: Jorge Frascara; Walter Jungkind; Carol J. Ladan; Thomas M. Nelson, all of Edmonton, Canada

[73] Assignee: The Governors of the University of Alberta, Canada

[21] Appl. No.: 22,806

[22] Filed: Mar. 22, 1979

[51] Int. Cl.³ .......................... G09B 1/40; G09B 1/34
[52] U.S. Cl. ................................... 434/159; 434/178; D18/29
[58] Field of Search ................... 35/35 R, 35 B, 35 C, 35/35 H, 36; 40/595; 283/8 R, 45, 46; 434/159, 178; D18/29

[56] References Cited

U.S. PATENT DOCUMENTS

| D. 9,740 | 2/1877 | Dreyfuss et al. ............... D18/29 X |
| D. 12,497 | 9/1881 | Müller ............................. D18/29 |
| D. 221,718 | 8/1971 | Fishback ......................... D18/29 |
| 3,571,951 | 3/1971 | Siegel et al. ................... 35/35 R |
| 4,045,884 | 9/1977 | Zand ............................... 35/35 R |

OTHER PUBLICATIONS

"The Ishihara Test for Color Blindness" *The American Journal of Physiological Optics*, Jul. 1924, pp. 269–276 and FIGS. 1,2.

*Primary Examiner*—Richard C. Pinkham
*Assistant Examiner*—Scott L. Brown
*Attorney, Agent, or Firm*—Max L. Wymore

[57] ABSTRACT

An alphabetic device is set forth to facilitate an initial reading process by providing additional discrimination cues to letters of traditional written languages. Letters of a written language are reproduced on a substrate such as paper, plastic etc. and confined within a zone. The zone, also reproduced on the substrate, is made up of dots, dashes, or lines arranged in regular arrays. A different zone is used for each letter such that each letter is always associated with its characteristic zone.

1 Claim, 7 Drawing Figures

Fig. 1a.
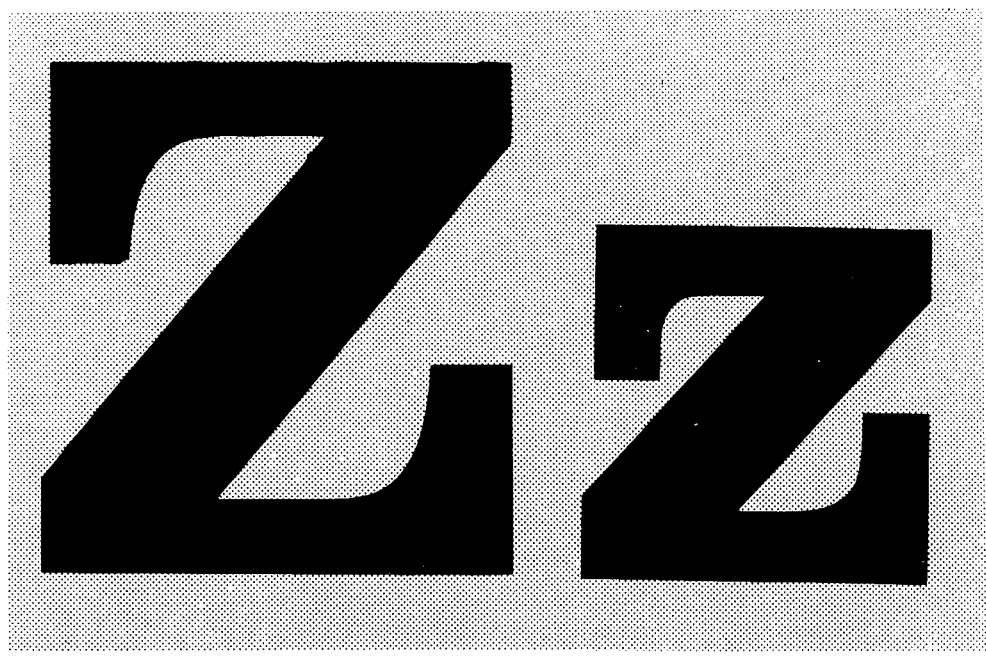
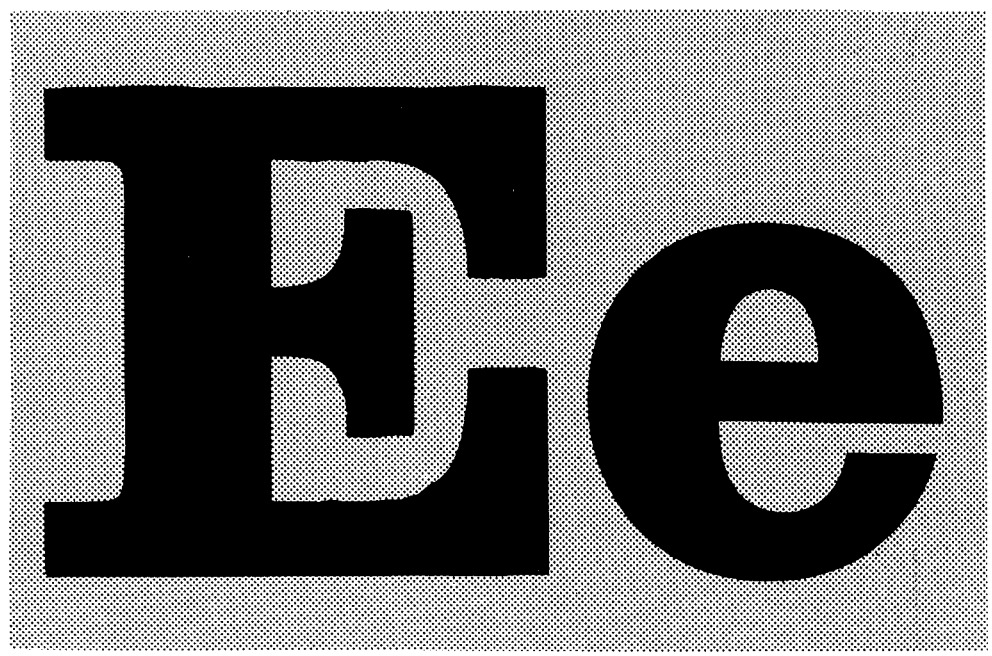

Fig.1b
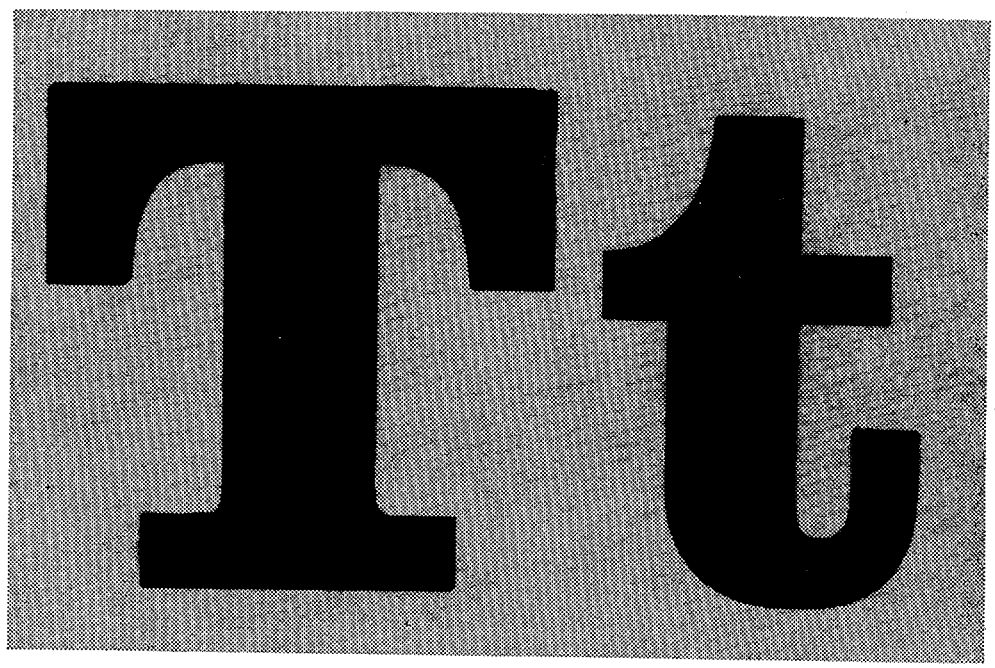
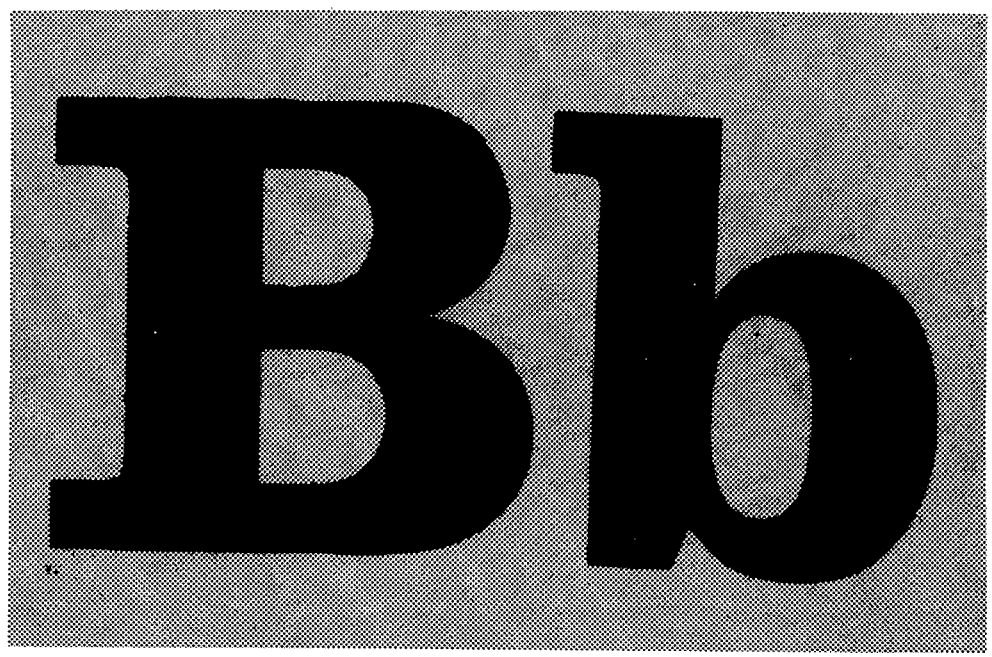

Fig. 1c.
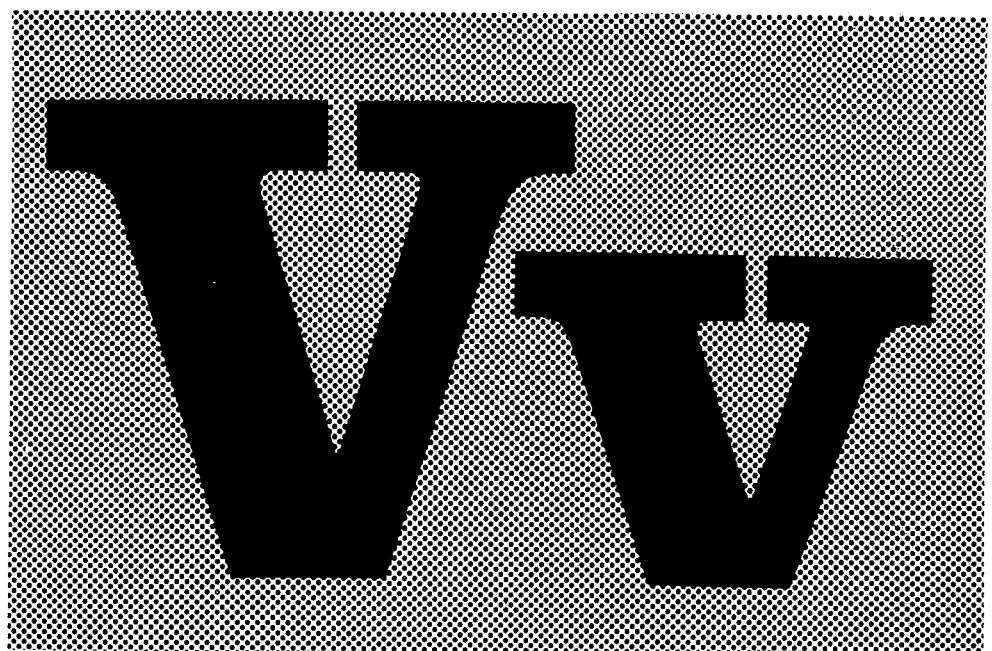
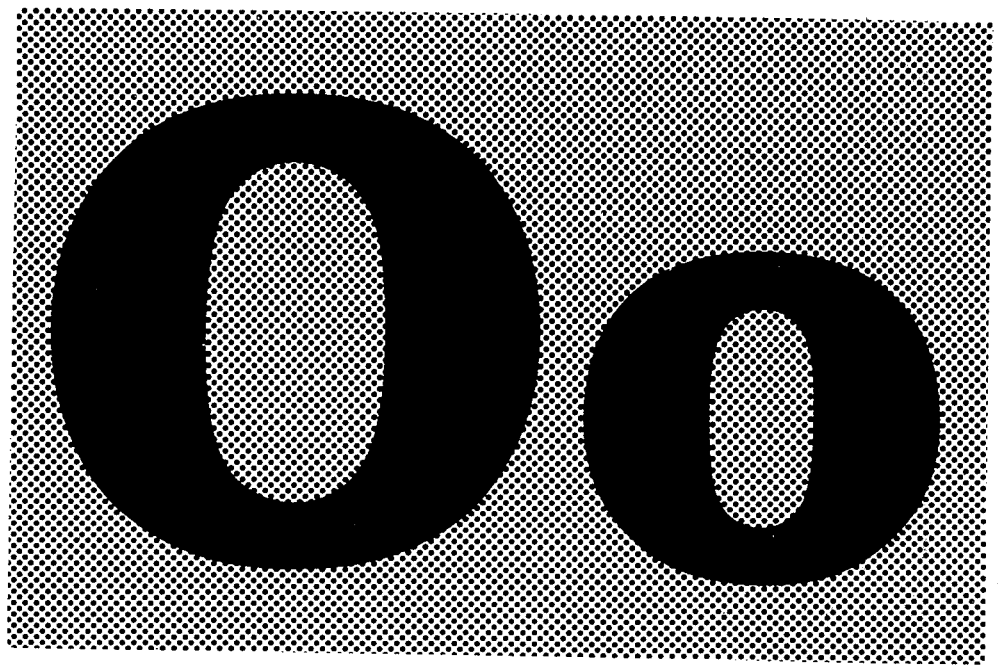

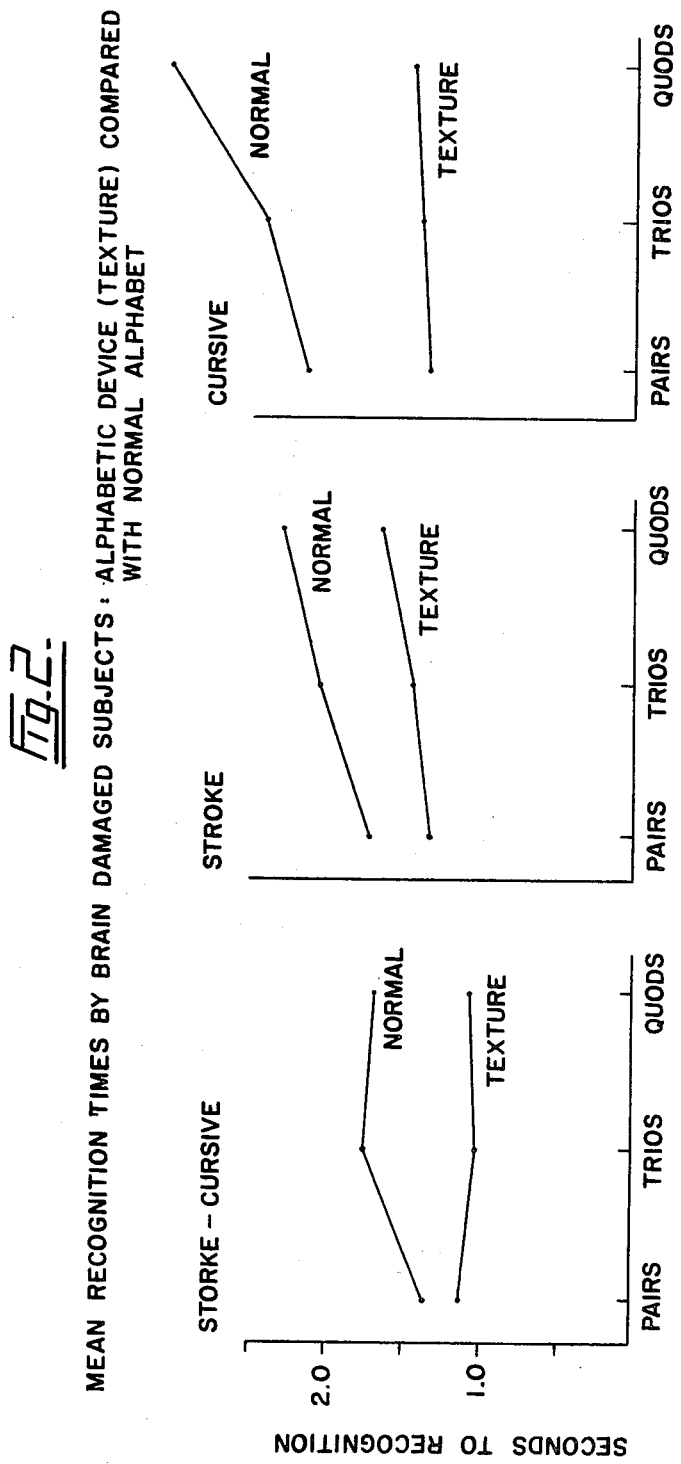

Fig. 3a.
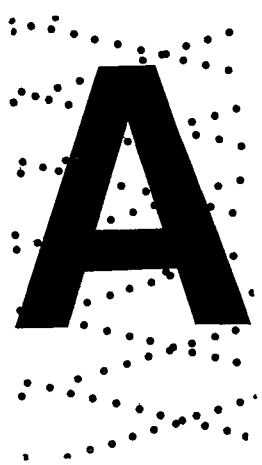 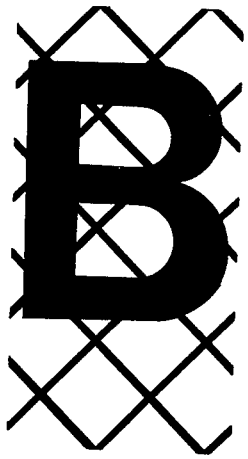 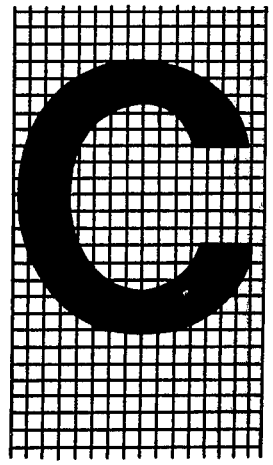
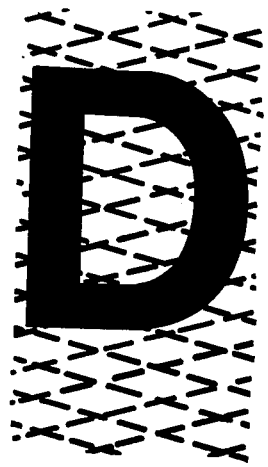 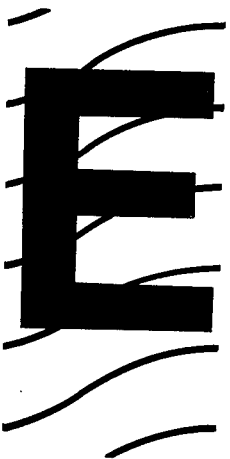 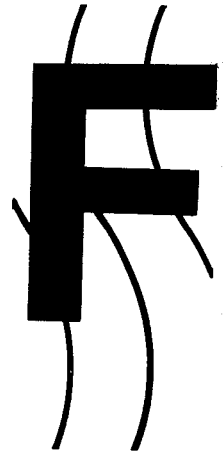
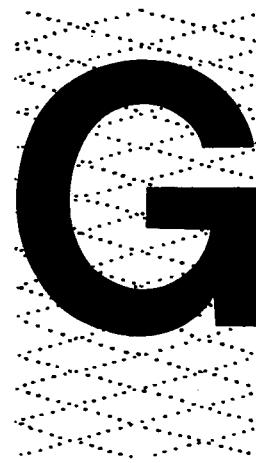 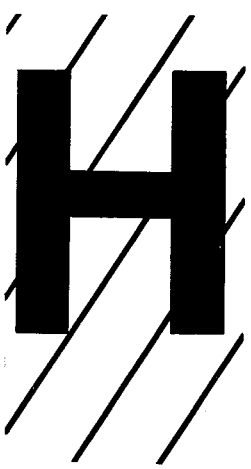 

Fig. 3b.
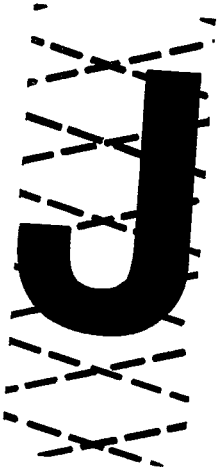 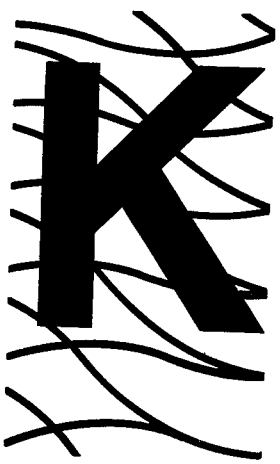 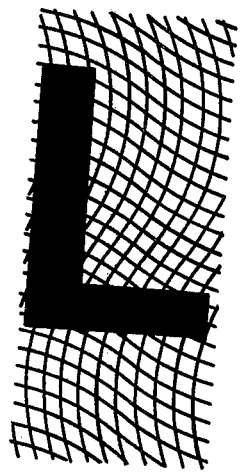
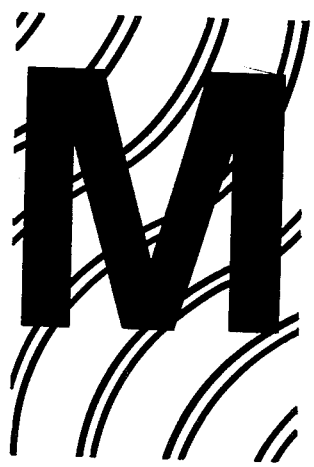 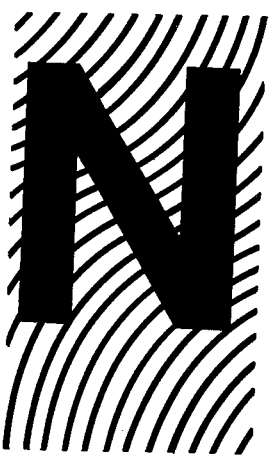 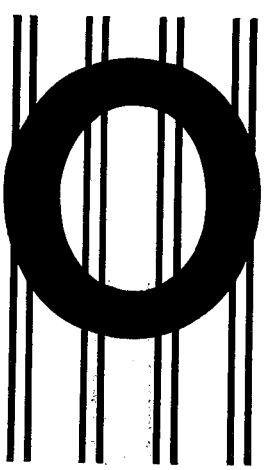
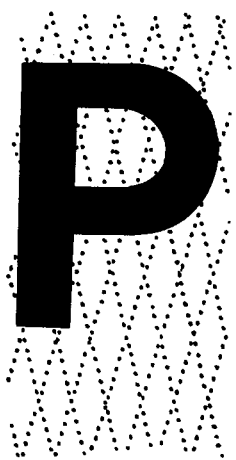 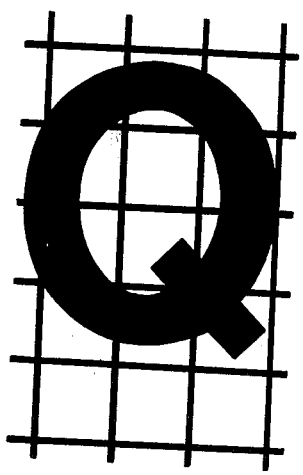 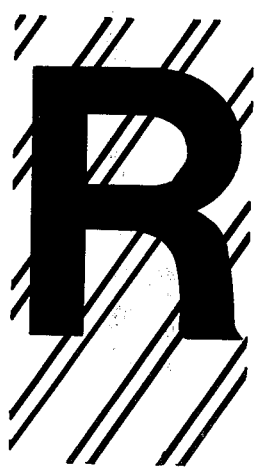

Fig. 3c.
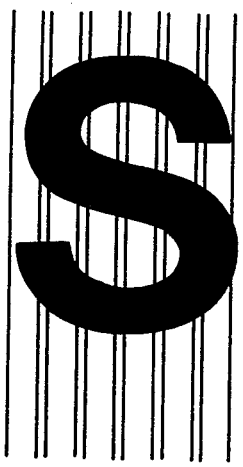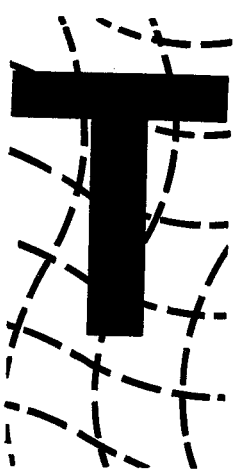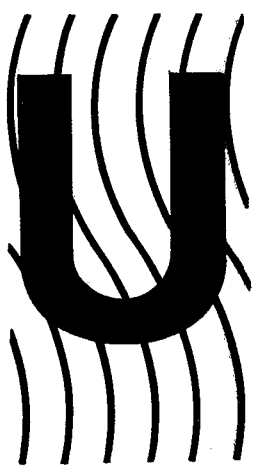
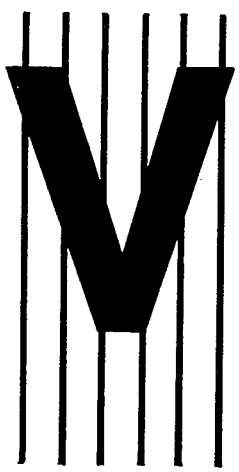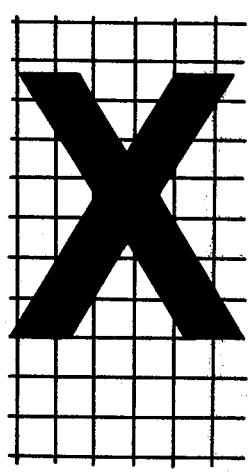
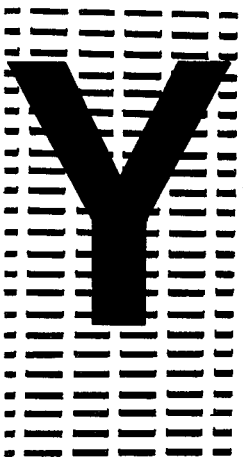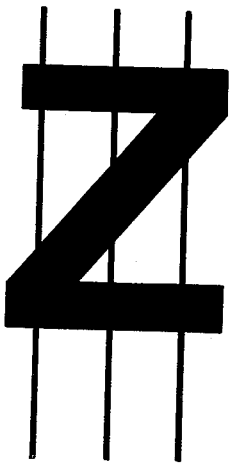

ALPHABETIC DEVICE

BACKGROUND OF THE INVENTION

The invention relates to an alphabetic device which can be used to facilitate the initial reading process.

The conventional phonetic alphabet is usually introduced as black letters against a white background. Many learners lack the ability to discriminate the edges of the letters and thereby cannot recognize them. The problem is further complexed due to the similarities which exist between many letters of the alphabet. For example p, b, d, differ only in their rotational configuration. The learner may further have difficulties recognizing the order of combinations of letters forming words. For instance the words "eat" and "tea" differ only in the order of the letters. One solution to the problem has been to provide a cue to the letters to aid in their discrimination.

One prior art method of providing discrimination cues to letters consists of printing the letter against a colored figure such as a red triangle. This method fails for the percentage of the population which are color-blind. Further the shape of the triangle still requires edge discrimination and colors are difficult and expensive to reproduce.

Another method uses ideograms, that is, symbols to represent words. These may be as simple as using drawings of objects or as complicated as the Chinese system of symbols for each word. Although ideograms are discriminable, the system requires a vast number of symbols to be learned. These are often difficult to reproduce and often do not lend themselves to the composition of sentences.

SUMMARY OF THE INVENTION

The invention provides an alphabetic device which gives additional discrimination cues to letters of traditional written languages to facilitate the initial reading process. The alphabetic device is particularly useful in the reading process of persons having learning difficulties.

In accordance with the invention, at least one letter of a written language is reproduced on a substrate comprising one or more of paper, metal, plastic, and wood and confined with a zone, said zone being reproduced on the substrate and made up of components selected from a group comprising dots, dashes and lines arranged in regular arrays. A different zone is used for each letter such that the letter is always associated with its characteristic zone.

DESCRIPTION OF THE DRAWINGS

FIGS. 1a, 1b and 1c are drawings of examples of the alphabetic device in the first embodiment in which the zones comprise a plurality of dots in regular array.

FIG. 2 is a graph showing the effectiveness of the alphabetic device in terms of time taken to recognize differences between letters of the present invention and letters of a normal alphabet.

FIGS. 3a, 3b, 3c are drawings of the second embodiment of the alphabetic device wherein the zones comprise dots, dashes or lines in regular array.

DESCRIPTION OF THE PREFERRED EMBODIMENT

Examples of the first embodiment used to develop the invention are shown in FIGS. 1a, 1b and 1c and involves letters of a written language being printed on a sheet of paper within the confines of a zone. The zone is comprised of a plurality of dots printed on the paper in regularly repeated intervals to form a regular array or pattern.

Each letter of the alphabet of a written language is printed within the confines of a zone unique to that letter, that is, a given letter is always associated with the same zone, regardless of whether the letter is printed in upper or lower case.

Two parameters are varied to construct a plurality of different zones. Percent darkness, that is the percent of the zone covered with dots, varies between 10 and 90%. The size of the dots is varied from the fine dots, illustrated by the letter "Z" to the coarse dots shown by the letter "O". By varying these two parameters, a very large number of different zones can be constructed, however, all of these are not equally effective discrimination cues to the letters printed therein.

The alphabetic device is used during the initial reading process wherein individuals are taught to read. The alphabetic device is introduced as individual letters within their unique zones, and later as combinations of a plurality of these letters, each letter, regardless of upper or lower case, within its unique zone. As the learner gains familiarity and success with the alphabetic device, the zones can be progressively faded out, that is printed in lighter shades, until the learner is able to recognize the letter itself, without the additional discrimination cue provided by the zones.

The following examples are used to exemplify an alphabetic device effective in aiding the initial reading process.

EXAMPLE 1

To arrive at an alphabetic device having the letters of an alphabet printed within distinct or different zones, pairs of the letters, each within a different zone were shown to a group of adults, and the reaction time to discriminate a difference was measured. This provided a measure of confusibility between the combination of letters within a zone. Those combinations having the lowest measures of confusibility were used to form the alphabetic device. The alphabetic device arrived at from these results represents the first embodiment of the invention examples of which are shown in FIGS. 1a–c.

EXAMPLE 2

The effectiveness of the alphabetic device of FIGS. 1a–c was shown by an experiment conducted with fifteen cerebral palsey children who were required to discriminate between alphabetic letters. It is known that the difficulties encountered by cerebral palsey children in learning to read is attributed to the difficulty in distinguishing letter shapes.

The letters of the alphabet were divided into three groups according to their shape characteristic, these shapes being, stroke exemplified in the letters 1, i; cursive exemplified by o, c; or stroke-cursive exemplified by p, d. Within these groups the letters were combined in conditions of two, three or four letters. Each condition was represented either with the letters printed in the traditional fashion of black letters on a white background, or with the letters printed in accordance with this invention.

The children were asked to respond "same" or "different" to the groups of letters presented to them in the conditions described above. The time required for a response was measured.

For all groups of letters presented, the children responded faster to the letters printed in accordance with this invention. In addition, although the response time increased as the number of letters in each condition increased, the effect was less noticeable for the letters printed in the manner of this invention than for the letters printed in the traditional fashion. These differences in response time are shown in FIG. 2.

EXAMPLE 3

A second embodiment used to develop this invention is shown in FIG. 3 and involves letters of the alphabet printed on a sheet of paper within the confines of a zone. In this case the zone is comprised of components selected from the group comprising dots, dashes and lines. The dots could assume any shape, such as stars, asteriks and triangles, however, they are printed as solid circles in FIGS. 3a-c. The components are printed on a sheet of paper in regular repeated intervals to form a regular array or pattern. The percent darkness of a zone is varied between 6 and 50%. The components are oriented vertically, horizontally or diagonally and can assume a straight or curved shape. The thickness of a component can also be varied.

By varying the above parameters, a very large number of zones can be constructed. The following example is used to exemplify an alphabetic device effective for use in an initial reading process.

To arrive at a group of thirty zones, each zone distinctive from the others, a group of four adults ranked 220 different zones as to their degree of distinctiveness from each other to form four groups of thirty zones which appeared to be most distinct. Forty adults then ranked the members of the four groups according to the following procedure. Within each group of thirty zones, each adult numerically ranked the zones as follows: the six most distinct zones were ranked 1, the next four most distinct were ranked 2, the next four most distinct were ranked 3 and the next four most distinct were ranked 4. Of these, the final thirty zones shown in FIG. 3 were arrived at by taking those zones ranked with the lowest numbers.

When combining each letter of the written alphabet within a zone, attention was given to place the letters, most easily confused by a learner, such as p, b, and d, on zones most distinct from each other. Alphabetic letters having a curved shape were placed, as close as possible, on zones composed of components arranged in a straight shape, while stroke letters were placed, as close as possible, on zones composed of components in a curved shape. The upper and lower cases of a given letter were always associated with the same zone.

The second embodiment of the alphabetic device has the advantage of being reducible in size to approximately 200 mm, without losing the ability to be used as an effective discrimination cue to letters of a written alphabet, thereby lending itself to reproduction in words and sentences in books.

The embodiments of the invention in which an exclusive property or privilege is claimed are defined as follows:

1. An alphabetic device to be used in an initial reading process comprising:
   a substrate comprising at least one of paper, metal, plastic, and wood having reproduced on it a plurality of letters of a traditional written language, each letter being reproduced within the confines of a zone, said zone being reproduced on said substrate and being made up of components selected from dots, dashes, and lines arranged in regular arrays, and each zone being distinct from each other zone and unique to the letter confined therein, whereby the zone provides an additional visual discrimination cue to aid in letter recognition.

* * * * *